United States Patent [19]

Gumbert

[11] 4,182,681

[45] Jan. 8, 1980

[54] FIRE-RETARDANT AGENT FOR TREATING CELLULOSE INSULATION, METHOD OF PREPARING THE AGENT, AND METHOD OF FABRICATING FIRE-RETARDANT CELLULOSE INSULATION

[76] Inventor: Daniel L. Gumbert, 4904 Tristam Ct., Fort Wayne, Ind. 46815

[21] Appl. No.: 922,812

[22] Filed: Jul. 10, 1978

[51] Int. Cl.$^2$ .............................................. C09K 3/28
[52] U.S. Cl. ................................. 252/8.1; 106/18.13; 106/18.16; 252/2; 252/7; 252/62
[58] Field of Search .................... 106/18.13, 18.16; 252/2, 7, 8.1, 62

[56] References Cited

U.S. PATENT DOCUMENTS

| | | | |
|---|---|---|---|
| 1,165,062 | 12/1915 | Borzner | 162/8 |
| 3,017,348 | 1/1962 | Steppe et al. | 252/7 X |
| 4,132,655 | 1/1979 | Dragnov | 252/2 X |

FOREIGN PATENT DOCUMENTS

| | | | |
|---|---|---|---|
| 1130294 | 5/1962 | Fed. Rep. of Germany | 252/7 |
| 2451792 | 5/1976 | Fed. Rep. of Germany | 252/8.1 |
| 869440 | 5/1961 | United Kingdom | 252/7 |

*Primary Examiner*—Leland A. Sebastian
*Attorney, Agent, or Firm*—Gust, Irish, Jeffers & Rickert

[57] ABSTRACT

The invention relates to a chemical agent for treating cellulose insulation and which consists of borax, ammonium sulphate, aluminum sulphate, soda ash, anhydrous silica gel and diammonium phosphate and method of fabricating the same, and a cellulosic insulation containing the aforesaid chemical agent.

9 Claims, No Drawings

FIRE-RETARDANT AGENT FOR TREATING CELLULOSE INSULATION, METHOD OF PREPARING THE AGENT, AND METHOD OF FABRICATING FIRE-RETARDANT CELLULOSE INSULATION

BACKGROUND OF THE INVENTION

1. Field of the Invention

The present invention relates to thermal insulation and more particularly to a chemical agent used in rendering cellulose insulation fire retardant.

2. Description of the Prior Art

Thermal insulation for use in buildings such as homes is composed of various basic materials, such as glass fiber, mineral wool and shredded paper. Shredded paper, commonly referred to as cellulose insulation, is the type to which the present invention is directed. Since paper per se may be easily ignited and presents a serious fire hazard, it is customarily treated with a chemical to render it fire retardant. In the past, such chemicals have resulted in producing toxic smoke and gases in the event of a fire, did not possess the requisite degree of flame or fire retardant properties, and reduced the insulating properties of the insulation due to the thermal conductivity of the chemical itself. Many of the prior art chemicals utilized boric acid which is relatively expensive.

SUMMARY OF THE INVENTION

The fire-retarding agent of this invention for impregnating cellulose insulation includes a composite of borax, ammonium sulphate, aluminum sulphate, soda ash, anhydrous silica gel and diammonium phosphate physically intermixed while excluding ambient air, the proportions of these ingredients being such as to provide a ph of about 7.5 to about 8.3 with the borax at about a ph of 9 and soda ash at about 10 to about 14, the silica gel being in an amount that moisturizes the composite in a range of about 0% to 6% by volume, the diammonium sulphate being in an amount that minimizes development of smoke by the aluminum sulphate, the ammonium sulphate being in an amount that minimizes development of smoke, the aluminum sulphate being in an amount to enhance the fire-retarding properties of the agent, such properties and amount further being such that cellulose insulation impregnated with twenty percent by weight of composite meets the test requirements of ASTM C739-73.

The method of producing the fire-retarding agent of this invention which consists of predetermined amounts of powder of borax, ammonium sulphate, aluminum sulphate, soda ash, silica gel and diammonium phosphate includes the steps of dry mixing a measured batch of such ingredients in a blender while excluding ambient air, such blender being operated at a speed and for a period of time short of that which will cause the release of ammonia gas and otherwise until a throughly mixed granular composite results.

The method of fabricating insulation of raw paper cellulose and dry chemical agent wherein said agent has a ph of about 7.5 to about 8.3 and a moisture content by volume of about 0% to 6%, said agent including predetermined amounts of borax, ammonium sulphate, aluminum sulphate, soda ash, anhydrous silica gel and diammonium phosphate which, when combined with said cellulose produces an insulation which meets the test requirements of ASTM C739-73, comprises the steps of dry mixing twenty percent by weight of agent and raw cellulose in a hammermill for a period of time as required for the agent to impregnate the cellulose, the mixing being performed while excluding ambient air and producing heat of friction to a temperature in the range of from about 140° F. to about 240° F. which vaporizes residual moisture in the agent, the vapor aiding in the agent's impregnation of the cellulose.

It is an object of this invention to provide an improved chemical agent for treating and rendering cellulose insulation fire retardant.

It is another object of this invention to provide a method of preparing such chemical agent.

Another object is to provide a method of producing cellulose insulation employing said chemical agent.

The above-mentioned and other features and objects of this invention and the manner of attaining them will become more apparent and the invention itself will be best understood by reference to the following description of the invention.

DESCRIPTION OF THE PREFERRED EMBODIMENT

Thermal insulation for use in buildings such as homes is composed of various basic materials, such as glass fiber, mineral wool and shredded paper. Insulation of shredded paper, commonly referred to as cellulose insulation, is the type to which the present invention is directed.

Inasmuch as paper per se is easily ignited and presents a serious fire hazard, it obviously is not suitable as building insulation unless it possesses a requisite degree of flame or fire retardance. The problem of minimizing the fire hazard of cellulose insulation has been of paramount concern and many solutions to the problem have been proposed.

Criteria in determining acceptability of such cellulose insulation relate to thermal conductivity and fire retardancy. Fire retardancy is generally achieved by chemically treating the raw cellulose insulation. The chemicals utilized must not only minimize the hazard of fire and smoke but must do so in a manner as will not deleteriously affect the thermal-insulating properties. Since such insulating properties are a function of density and density can be affected by the particular chemicals used in meeting the criteria, a balance of variables in the kinds and amounts of chemicals and methods of utilizing these in treating the raw insulation must be met in order to obtain an acceptable product as determined by Federal test standards.

A mass of cellulose insulation of given density possesses an insulating property quantitatively referred to in the art as "R" factor which is empirically determined according to a test procedure specified in the *American Society of Testing and Materials* (ASTM), book Part 18, designation No. C739-73, and in H.H.I. 515C promulgated by the Department of Housing and Urban Development (HUD). The higher the "R" factor the better the insulating quality. Chemical treatment to minimize the hazard of fire can affect the "R" factor for a variety of reasons. It is thus critical in achieving a suitable thermal insulation that both the "R" factor and the property of fire retardancy be maximized, control of insulation density being of prime concern.

Density of the cellulose insulation is determined by several factors, these including the raw insulating material (in this instance paper), the degree of shredding and compacting thereof, the thermal conductivity of the chemical impregnant and the susceptibility to the absorption of moisture. The shredded material spread over a given area to a given thickness will have a corresponding density and "R" value whatever that may be. The fire-retardant chemicals have certain thermal conductivities in and of themselves which can add to or detract from the "R" factor of the finished insulation. The amount of moisture contained within the insulation, usually absorbed from the ambient air, determines to some extent the degree of compactness, hence density. Water itself is considered to be a thermal conductor. Thus, the selection and quantity of chemicals utilized have a bearing on the "R" value.

The chemicals available for maximizing fire retardancy, while numerous, are not all suitable for various reasons among which are degradation of "R" value, corrosiveness, production of toxic smoke and gases, and excessive moisture absorption. With respect to adversely affecting "R" factor, excessive amounts of some chemicals must be used in order to obtain a suitable degree of fire retardancy and this contributes to the thermal conductivity of the insulation. Some chemicals attract excessive moisture causing compaction of the insulation, yet others cause corrosion of nearby structural elements. Some chemicals produce excessive smoke, others produce smoke and gases that are toxic when subjected to temperatures produced during a fire. Still other chemicals have the property of separating from the raw cellulose or paper material after a period of time thus destroying the fire retardant efficacy. Various chemicals interact in a manner that deleteriously affects either or both the "R" factor and fire retardancy. Hence, the problem of rendering cellulose insulation retardant to fire and yet maintain the insulating and other characteristics desired in the insulation is complex, a large variety of interacting variables being involved.

Still another factor is the economy in the manufacture of the insulation and the materials employed. To be competitive in the market of home insulation, the product must be priced in the range of other insulating materials, such as glass fiber and mineral wool.

In this invention, due regard is given to maximizing the qualities of "R" factor and fire retardancy and minimizing corrosiveness and smoke production through the use of a balanced formula of chemicals in minimum quantities, which are economical and plentiful. Functionally, such a formula serves in retaining desired density by or through controlled absorption of moisture from the ambient air which serves additionally in maximizing the effectiveness of the fire retarding chemicals. The chemical formulation of this invention is directed toward rendering cellulose insulation fire retardant, non-corrosive, of minimal density, minimally productive of smoke and gas, controllably absorptive of moisture and economical. Through the interaction, both physical and possibly chemical, of selected chemical ingredients in the formulation, insulation meeting the test standards of said ASTM C739-73 are provided at competitive prices.

Referring more specifically to this invention, shredded paper of a screen size or granulation in the range of ⅛ to ¼ inch, hereafter referred to as cellulose, is the basic thermal insulation ingredient. Since it presents a fire hazard, it alone is not acceptable as thermal insulation for buildings. Acceptability further hinges on rendering it suitably resistant to flame or fire which is accomplished by impregnation with particular chemicals.

The chemicals used in this invention are in powder or granular form, and for one working embodiment, in eighty (80) pound batches, are as follows:

| Chemical | Weight in Pounds | Percentage |
| --- | --- | --- |
| Borax (fertilizer grade) | 34 | 42.5 |
| Ammonium sulphate (21%N) | 25 | 31.25 |
| Aluminum sulphate | 15 | 18.75 |
| Soda Ash | 3.5 | 4.375 |
| Silica gel | 1.0 | 1.25 |
| Diammonium phosphate | 1.5 | 1.875 |
| | 80 pounds | 100% |

The borax is fertilizer grade as produced by U.S. Borax Corp., 3075 Wilshire Boulevard, Los Angeles, California, sold under the trademark "5 MolBorax" and includes by weight boron (B) derived from sodium borate about 14.9%, boron trioxide ($B_2O_3$) about 48%, and borax equivalent ($Na_2B_4O_7.10H_2O$) about 131%, about seventy six (76) pounds of these chemicals being contained in a total of about one hundred (100) pounds of borax. The borax equivalent is manufactured and sold by Kerr-McGee Chemical Corporation of Oklahoma City, Oklahoma, under the brand name "Three Elephant V-Bor" refined pentahydrate borax, and otherwise is chemically described as sodium tetraborate pentahydrate, borax pentahydrate, sodium biborate pentahydrate and octahedral borax. It is in fine granular form of from 30-100 mesh, standard.

The ammonium sulphate is of granular fertilizer grade as produced and sold by NIPRO, Inc., Augusta, Georgia. The typical analysis, by weight, is as follows:

| | |
| --- | --- |
| Total nitrogen | 21.00% |
| Combined Ammonical Nitrogen | 21.00% |
| Total Sulphur | 24.10% |
| Moisture | 0.40% |
| Bulk density | 63–66 lbs./cu.ft. |
| Typical screen analysis | −6 + 16 (U.S. Standard) 95% |
| | −6 + 14 (Tyler) 95% |

The aluminum sulphate is a powder of about 200 mesh to a particle size of about 1/32", and is a product manufactured and sold under the code 022-1303 by Allied Chemical Co., Morristown, New Jersey 07960. It is theorized to act as a catalyst between the ammonium sulphate and borax and is a fire-proofing and deodorizing agent.

The soda ash in powder form of about 200–400 mesh is light grate, 58% $Na_2O$, manufactured and sold by BASF Wyandotte, Wyandotte, Michigan.

The silica gel of about 200 mesh is a product manufactured and sold under the trademark THE PACESETTER by Davison Chemical, Baltimore, Maryland.

The diammonium phosphate of about 200 mesh is a product manufactured and sold by Monsanto Co., St. Louis, Missouri.

The silica gel of about 200 mesh is maintained in anhydrous form, in sealed containers for example, to just prior to its being mixed with the other ingredients.

In the proportions noted, the ingredients are dry mixed at room temperature, preferably in two thousand pound batches, in a double ribbon blender of the center discharge type operated at a speed of about 42 revolutions per minute for a period of about three minutes or until thoroughly mixed. Other speeds may be used, provided it is not so high as to release ammonia gas.

During mixing, air is excluded by suitably sealing the ribbon blender. When the mixing is completed, the composite in granular form (later referred to as the fire-retarding agent) is discharged in about eighty (80) pound lots into bags suitably sealed to exclude ambient atmosphere. Thus bagged, it is ready for use in treating raw cellulose insulation.

The ribbon blender used was manufactured by Struthers Wells Company of Titusville, Pennsylvania, on or about June 26, 1950, Ser. No. 451290M, Class 2G-Form S, at a rated rpm of 1770 providing a basic mixing speed of 70.07 rpm. A gear box produced by Falk Corp. of Milwaukee, Wisconsin, of a size denoted as 315JFV25B3 and providing a speed reduction ratio of 25.26 to 1 was installed in the blender to reduce the mixing speed thereof to about the aforesaid speed of 42 rpm.

The mixing of the dry ingredients is performed while excluding ambient air until a thoroughly mixed granular composite is produced. The anhydrous silica gel absorbs some of the residual moisture in the order ingredients facilitating mixing and later use of the agent in impregnating the cellulose insulation as the fire-retarding agent. It also enhances the take-up of moisture by the ammonium sulphate and reduces the amount of borax needed thereby aiding in keeping the quantities of agent in insulation within desired limits.

The agent is used to impregnate the cellulose insulation by means of two conventional hammermills, the first utilizing a one-half inch ($\frac{1}{2}''$) screen and the second having a three-eighths inch ($\frac{3}{8}''$) screen. An auger or belt conveyor is used to convey the material from the first to the second mill.

The chemical agent and raw cellulose insulation are first dry mixed, in the ratio of about twenty percent (20%) by weight of agent in the total of the agent and raw cellulose insulation, and hammered or processed in the first mill for a sufficient period of time, such as one minute, as required for the agent to penetrate or impregnate the cellulose. The cylinder in the hammermill is set to clear the screen by about one-eighth inch ($\frac{1}{8}''$). Screen size is selected such that the agent uniformly impregnates or is otherwise taken up and held by the cellulose, one-half inch ($\frac{1}{2}''$) screen size being suitable. If the openings are too large, proper impregnation with not be achieved. Such impregnation is proper when the treated cellulose meets with the test requirements of ASTM C739-73 or H.H.I. 515C-76.

During processing, the mill is sealed from ambient atmosphere. Heat energy facilitates impregnation and this is derived from the heat of friction generated by the processing. Temperatures in the order of from about 140° F. to about 240° F. have been found to be satisfactory and in fact are required to activate the ammonium sulphate. Residual moisture in the cellulose and chemicals vaporizes due to the generated heat. The moisture taken up by the silica gel also vaporizes, the vapor aiding in the impregnation.

Following processing in the first mill, the material is conveyed to the second mill having a three-eighths inch ($\frac{3}{8}''$) screen for finishing and reducing particle size, for about one minute or until the cellulose is adequately saturated or impregnated. The finished material is then packaged in sealed containers or bags and ready for installation.

Acceptable insulation must meet the test standards for fire retardancy and thermal insulation value as given in ASTM C739-73 or H.H.I. 515C-76.

RETAINED MOISTURE

The treated cellulose requires some moisture once installed, from about ten to twelve percent (10%–12%) by volume of insulation installed, the chemical agent in the bag having from zero to about six percent (0%–6%) moisture by volume. Properly moisturized, the chemical agent is retained by the cellulose and is properly activated to function in retarding fire. The silica gel takes up moisture from the atmosphere assuring adequate moisturizing of the insulation. Excessive moisture results in undesired compacting with consequent loss of "R" value.

Retained moisture assures permanancy of the impregnant in the cellulose. The ammonium sulphate and diammonium phosphate are suitably moisturized rendering them conjointly effective in the fire-retarding function thereof, these chemicals taking on moisture in the presence of the silica gel. Should the atmosphere become dry, the silica gel nevertheless functions to provide the necessary degree of retained moisture. The chemical make up, especially the amount of silica gel, assures that the retained moisture will remain within limits, not to exceed fifteen percent (15%) by volume.

CORROSION RESISTANCE

The diammonium phosphate, aluminum sulphate and ammonium sulphate exhibit corrosive properties which must be neutralized. The soda ash and borax constitute neutralizing agents which inhibit corrosion thereby rendering the insulation non-corrosive. The ph of the agent should be above 7.5, and more desirably between about 7.9 and about 8.3. The borax has a ph of about 9 whereas the soda ash ranges from about 10 to 14. A maximum amount of borax is desired because of its fire retardant properties. However, if only borax and no soda ash is used, the amount of borax required to overcome the corrosive properties of the other chemicals becomes excessive thereby exceeding the amount of chemical agent necessary in the cellulose. Stated otherwise, the chemical content of the cellulose would become so high that the insulation density would exceed its upper limit of three pounds per cubic foot. Therefore, in order to keep the allowable quantity of agent in the cellulose adequately low, the higher ph soda ash is used. Thus, in the chemical agent, a maximum of borax as limited by insulation density for its fire retardant and corrosion inhibiting properties is used, the soda ash in small amounts being a supplement to enhance the corrosion inhibiting properties thereby keeping the quantity of chemical agent needed in the insulation below the upper limit. Balancing of these variables as is accomplished in this invention results in maximizing both the insulating and fire retarding factors. This balance is optimized by using in the total weight of insulation about twenty percent (20%) by weight of the chemical agent.

FIRE RETARDANCY

The borax, ammonium sulphate, aluminum sulphate, soda ash and diammonium phosphate interact to render the insulation fire retardant and to minimize production of smoke when subjected to flame. The diammonium phosphate must be suitably moisturized to be effective and as previously explained, this is assured by reason of the presence of the silica gel. In its function, the diammonium phosphate interacts with the aluminum sulphate to counteract or minimize the smoke normally produced by the latter and to prevent afterglow.

The ammonium sulphate interacts with the borax to enhance the fire-retarding properties, this interaction thought to be further enabled by the presence of the aluminum sulphate acting as a catalyst. With respect to the impregnating of the cellulose, the heat energy generated at temperatures in the range of 140° F. to 240° F. activates the ammonium sulphate rendering it effective in the composite in minimizing generation of smoke.

The soda ash serves in retarding flame front, thus cooperating with the other non-flammable chemicals in retarding fire spread. By the interaction of all the ingredients, fire and flame is either prevented or inhibited in different ways, each supplementing the other in the total fire retarding action.

The quantities of the individual ingredients used is empirically determined and altered as required, following the test procedure of ASTM C739-73 or H.H.I. 515C-16 until the values of flame spread, fuel contribution and smoke development prescribed for Class I materials are realized. Tests show that for this invention, a low flame spread rating and improved fire retardance of Flame Spread 15, Fuel Contribution 5, and Smoke Development 15 are achieved. The chemical agent does not separate from the cellulose, this believed to be due to the self-moisturizing character of the insulation. Also, it has been observed that for a reason not understood, the borax and ammonium sulphate do not separate. No boric acid is required in the agent of this invention, an ingredient which would materially add to cost.

The fire-retarding agent of this invention can be bagged and sold to fabricators of insulation thereby eliminating the need on the part of the fabricator to handle, measure, mix and otherwise equip his facility to process the chemicals. This minimizes the chances of error in formulating the chemical. Uniformity and quality in the finished insulation is thereby promoted, resulting in reduced waste and the possibility of delivering an insulation not meeting code requirements.

While there have been described above the principles of this invention in connection with specific apparatus, it is to be clearly understood that this description is made only by way of example and not as a limitation to the scope of the invention.

What is claimed is:

1. A fire-retarding agent for impregnating cellulose insulation comprising a composite of borax, ammonium sulphate, aluminum sulphate, soda ash, anhydrous silica gel and diammonium phosphate physically intermixed while excluding ambient air in proportions as provide a ph of about 7.5 to about 8.3 with the borax at about a ph of 9 and soda ash at about 10 to about 14, silica gel in an amount that moisturizes the composite in the range of about 0%–6% by volume, diammonium phosphate in an amount that minimizes development of smoke by the aluminum sulphate, ammonium sulphate in an amount that minimizes the development of smoke, aluminum sulphate in an amount to enhance the fire-retarding properties of the agent, such proportions and amounts further being such that cellulose insulation impregnated with twenty percent by weight of composite meets the test requirements of ASTM C739-73 for Class I materials.

2. The agent of claim 1 wherein by weight the borax is about 42.5%, the ammonium sulphate is about 31.25%, the aluminum sulphate is about 18.75%, the soda ash is about 4.375%, the silica gel is about 1.25% and the diammonium phosphate is about 1.875%.

3. A fire-retarding agent for impregnating cellulose insulation consisting of a composite of borax, ammonium sulphate, aluminum sulphate, soda ash, anhydrous silica gel and diammonium phosphate physically intermixed while excluding ambient air in proportions as provide a ph of about 7.5 to about 8.3 with the borax at about a ph of 9 and soda ash at about 10 to about 14, silica gel in an amount that moisturizes the composite in the range of about 0%–6% by volume, diammonium phosphate in an amount that minimizes development of smoke by the aluminum sulphate, ammonium sulphate in an amount that minimizes the development of smoke, aluminum sulphate in an amount to enhance the fire-retarding properties of the agent, such proportions and amounts further being such that cellulose insulation impregnated with twenty percent by weight of composite meets the test requirements of ASTM C739-73 for Class I materials.

4. The agent of claim 3 wherein by weight the borax is about 42.5%, the ammonium sulphate is about 31.25%, the aluminum sulphate is about 18.75%, the soda ash is about 4.375%, the silica gel is about 1.25% and the diammonium phosphate is about 1.875%.

5. The method of producing a fire-retarding agent which consists of predetermined amounts of borax, ammonium sulphate, aluminum sulphate, soda ash, silica gel and diammonium phosphate including the steps of dry mixing a measured batch of such ingredients in a blender while excluding ambient air, such blender being operated at a speed and for a period of time short of that which will cause the release of ammonia gas and otherwise until a thoroughly mixed granular composite results.

6. The method of claim 5 wherein said blender is a double ribbon blender of the center discharge type operated at a speed of about fourty-two revolutions per minute for about three minutes.

7. The method of fabricating insulation of raw paper cellulose and dry chemical agent wherein said agent has a ph of from about 7.5 to 8.3 and a moisture content by volume of from about 0 to 6 percent, said agent including predetermined amounts of borax, ammonium sulphate, aluminum sulphate, soda ash, anhydrous silica gel and diammonium phosphate which, when combined with said cellulose produces an insulation which meets the test requirements of ASTM C739-73 for Class I materials, comprising the steps of dry mixing twenty percent by weight of agent and raw cellulose in a hammermill for a period of time as required for the agent to impregnate said cellulose, said mixing being performed while excluding ambient air and producing heat of friction to a temperature in the range of from about 140° F. to about 240° F. which vaporizes residual moisture in said agent, said vapor aiding in the agent's impregnation of said cellulose.

8. The method of claim 7 wherein said mixing is performed in two stages, the first stage being in a hammermill having a one-half inch screen and the second being in another hammermill having a three-eighths inch screen.

9. The method of claim 8 wherein said mixing in each stage is for about one minute.

* * * * *